(12) United States Patent
Balfour

(10) Patent No.: US 7,462,061 B2
(45) Date of Patent: Dec. 9, 2008

(54) CONNECTOR FOR LOCATE WIRES

(75) Inventor: William J. Balfour, Winsted, CT (US)

(73) Assignee: Electric Motion Company, Inc., Winsted, CT (US)

( * ) Notice: Subject to any disclaimer, the term of this patent is extended or adjusted under 35 U.S.C. 154(b) by 0 days.

(21) Appl. No.: 11/473,808

(22) Filed: Jun. 23, 2006

(65) Prior Publication Data

US 2007/0298632 A1    Dec. 27, 2007

(51) Int. Cl.
*H01R 4/24* (2006.01)
*H01R 4/26* (2006.01)
*H01R 11/20* (2006.01)

(52) U.S. Cl. ...................................... 439/409

(58) Field of Classification Search ......... 439/409–413, 439/98, 99, 402, 269.2, 488, 489, 491, 261
See application file for complete search history.

(56) References Cited

U.S. PATENT DOCUMENTS 4,173,067 A * 11/1979 Steiner et al. .................. 29/749
5,513,075 A *  4/1996 Capper et al. ............... 439/409
6,299,474 B2 * 10/2001 Daoud ........................ 439/409
6,302,564 B1 * 10/2001 Wedell et al. ............... 439/488

* cited by examiner

*Primary Examiner*—Felix O. Figueroa
(74) *Attorney, Agent, or Firm*—Alix, Yale & Ristas, LLP

(57) ABSTRACT

A connector for locate wires employs a platform which has a plurality of angularly spaced wire apertures. A conductive wire stripper member has a plurality of slots corresponding to said apertures and is angularly positionable between closed and open positions. Locate wires may be connected by inserting the wires into the apertures when the wire member is in an open position and electrically connected by angularly pivoting the conductive member to the closed position. A ground connector provides a ground connection for the connector to ground the locate wires.

19 Claims, 5 Drawing Sheets

CONNECTOR FOR LOCATE WIRES

BACKGROUND OF THE INVENTION

This invention relates generally to electrical connection devices and methods which are employed for connecting locate wires for underground optical cables and for bonding the locate wires and grounding same.

When optical cables are installed underground, it is common to string locate wires with the cables to aid in locating the cables after installation. In applications, such as for residential applications, the locate wires are connected together at handholes and are also grounded at the handhole.

SUMMARY OF THE INVENTION

Briefly stated, a connector for locate wires in one embodiment comprises a platform which has a plurality of angularly spaced wire apertures. A conductive wire stripper plate is disposed for angular rotation relative to the platform. The conductive plate defines a plurality of generally arcuately shaped slots which correspond to the wire apertures. An arm extends from the conductive plate. The platform is adapted for mounting to a handhole or a buried vault via a pair of projecting wings which have openings. The slots are configured to have an enlarged circular portion at one end and a reduced portion at another end. In the open position, the circular portions of the slots align with the wire apertures. A plurality of wires to be connected are inserted into respective apertures and slots, and the arm is moveable to effect an electrical connection with the wires. The arm engages an interior wall in the closed position for maintaining the closed position.

Upon angular movement, the conductive plate removes non-conductive matter from the inserted wires. A dielectric material may be injected onto the surface of the conductive plate. A bolt extends through the platform and the conductive plate and a ground connector is connected to the bolt. As the conductive plate moves from the open to the closed position, the stripper plate strips non-conductive material from the wires. In one embodiment, six angularly spaced apertures and slots are provided and the platform is formed from mating components with the stripper plate being intermediately received therein.

DETAILED DESCRIPTION OF THE PREFERRED EMBODIMENTS

Figure 1:
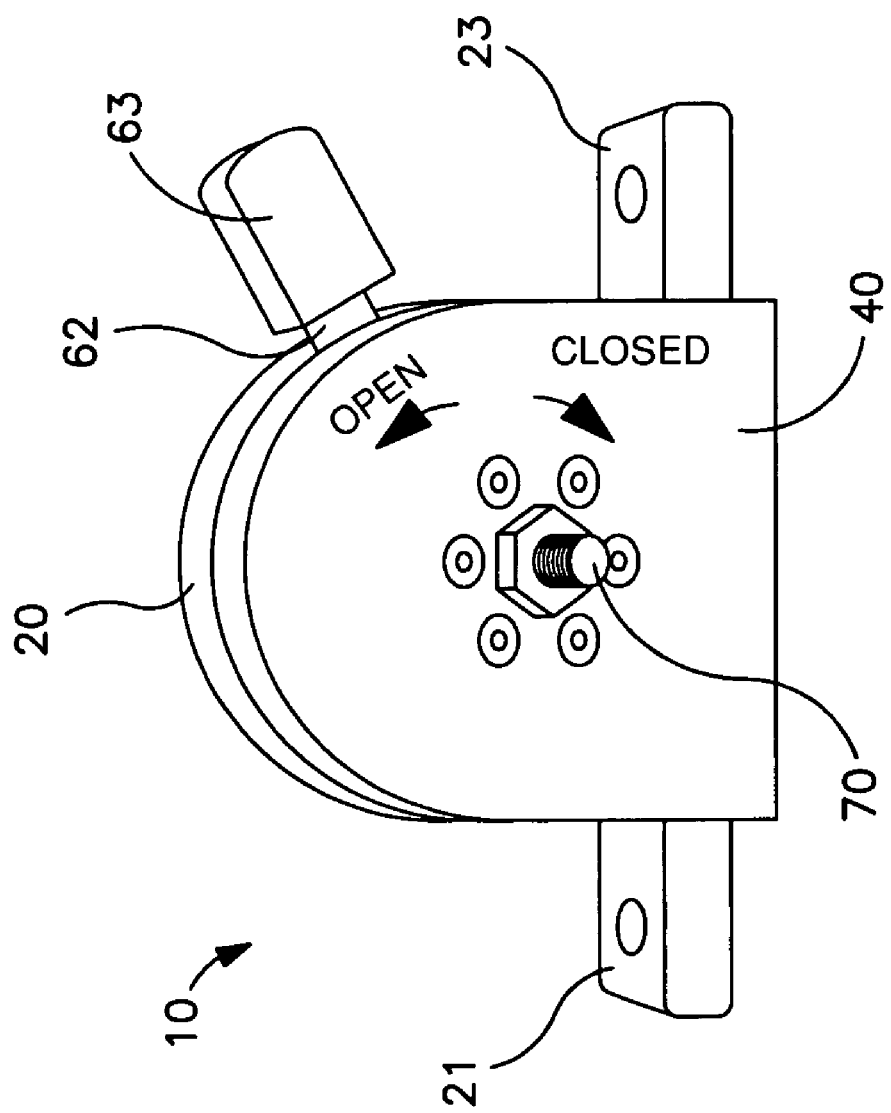
FIG. 1 is a generally top perspective view of a connector for locate wires.

With reference to the drawings wherein like numerals represent like parts throughout the several figures, a locate wire connector is generally designated by the numeral 10. Locate wire connector 10 is adapted to provide a bonding and grounding connector for use in handholes representatively designated by the numeral 12 or buried ground vaults (not illustrated). The connector is adapted to connect locate wires 14 such as are employed for identifying the location of underground optical cables. The connector 10 electrically connects the locate wires and grounds the locate wires to ground via a ground wire 16, a grounding halo 18 or other grounding means (not illustrated).

The locate wire connector 10 is principally comprised of a molded base 20 which mates with a clamp cover 40 to form a platform. The clamp cover and base cooperate to receive a rotatable stripper wire plate 60 which is rotatably mounted and secured by a bolt 70 which receives a ground connector 80.

Figure 3:
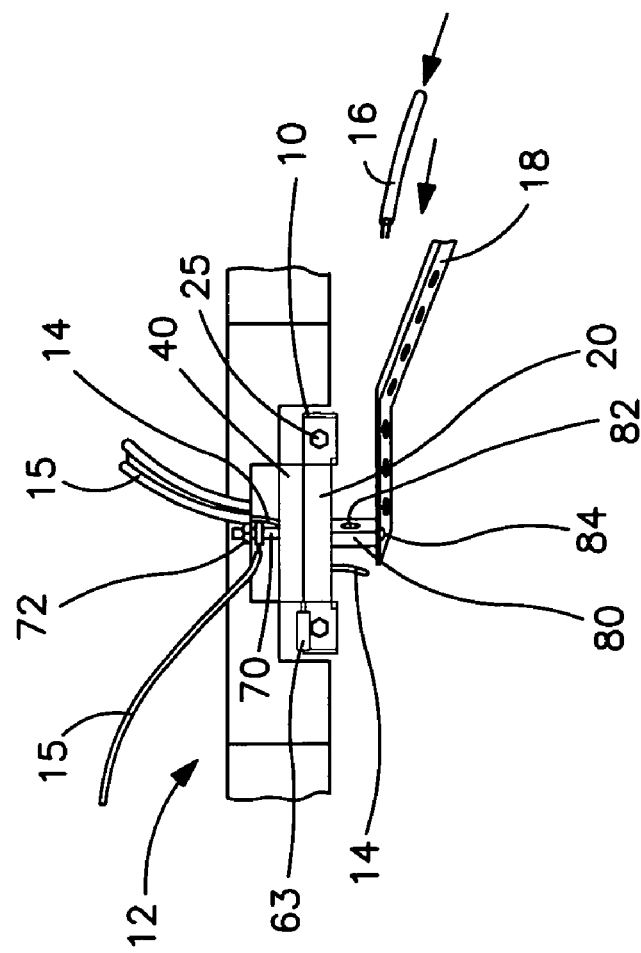
FIG. 3 is an interior side view of the connector/handhole installation of FIG. 2 and further illustrating a pair of locate wires and a grounding connection, including a representational ground wire.
Figure 2:
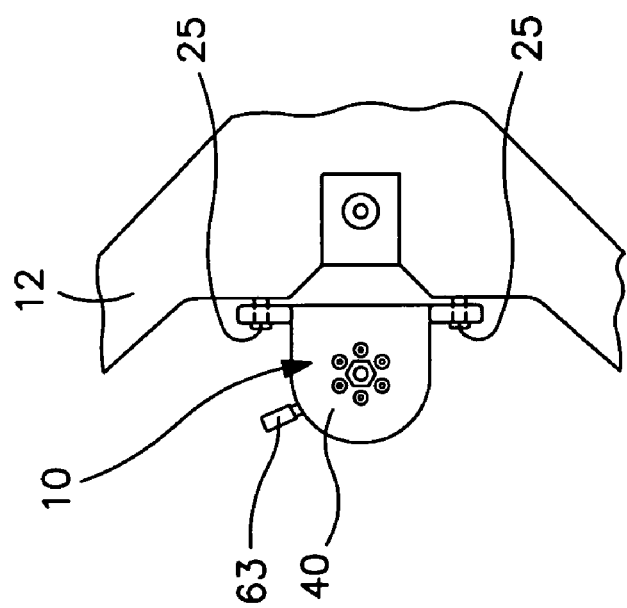
FIG. 2 is a top view of the connector of FIG. 1 mounted near the top of a handhole (partially illustrated)
Figure 9:
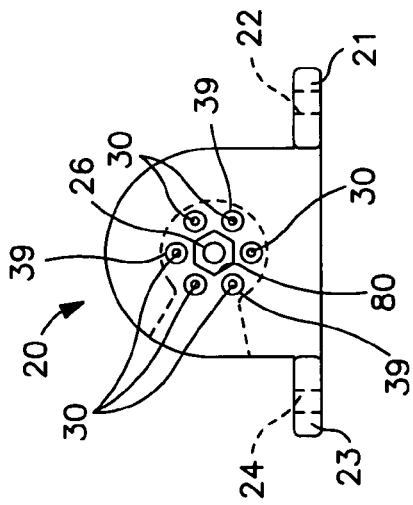
FIG. 9 a bottom plan view, partially in broken lines, of the component of FIG. 8.
Figure 10:
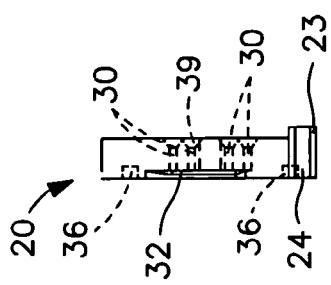
FIG. 10 is a side view, partially in broken lines and partially in section, of the component of FIG. 8.
Figure 8:
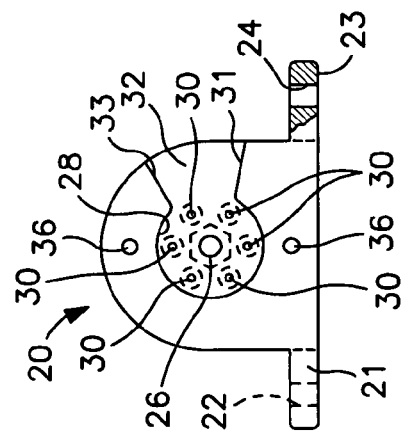
FIG. 8 is a top plan view, partially in broken lines, of a bottom component of the connector of FIG. 1.

With reference to FIGS. 8-10, the base 20 is a molded scallop-shaped member which has a pair of oppositely projecting wings 21, 23 which each have an opening 22, 24. The openings 22, 24 are dimensioned to receive a sheet metal screw 25 for securing the base (and the assembled locate wire connector) in a preferred installation to the interior of a handhole 12 near the top portion thereof, as illustrated in FIGS. 2 and 3.

With reference to FIG. 8, the upper surface of the base 20 includes a central opening 26 surrounded by a circular recess 28 which laterally extends into a deeper recess 32 defined between walls 31 and 33. Six equiangularly spaced bores 30 extend from the recess to the base. The base also includes a pair of diametrally spaced wells 36. With reference to FIG. 9, the underside of the base includes a central recess 38 which receives a hexhead connector 80 for the bolt 70. The underside of the base may also include conical lead indentations 39 surrounding the underside openings of the bores 30.

With reference to FIGS. 4-7, a quasi-scallop-shaped clamp cover 40 is dimensioned to mate with the base 20. The upper surface of the clamp cover includes a central opening 42 for the bolt 70 and includes conical tapers 59 surrounding the upper openings of the bores. Six equiangularly spaced bores 50 which align with bores 30 extend through the cover. A pair of integral studs 44 project from the underside and are received in the wells 36 to facilitate the mating of the cover 40 and the base 20 which cooperates to form a platform.

Figure 5:
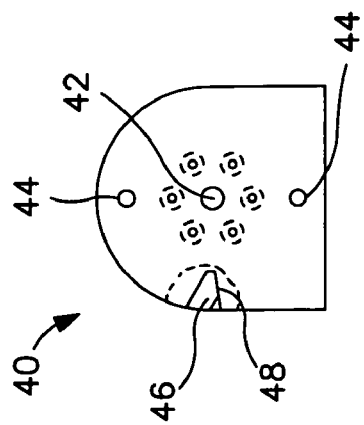
FIG. 5 is a bottom plan view of the component of FIG. 4.
Figure 7:
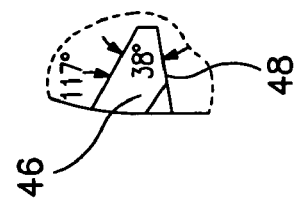
FIG. 7 is an enlarged fragmentary view of an underside portion of the view of FIG. 5.
Figure 4:
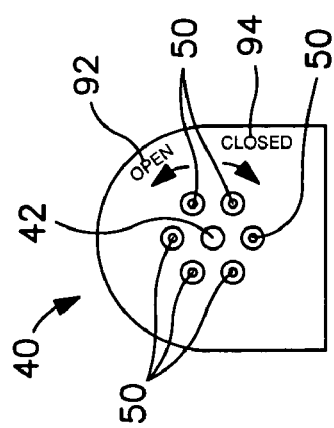
FIG. 4 is a top plan view of an upper component of the connector of FIG. 1.
Figure 6:
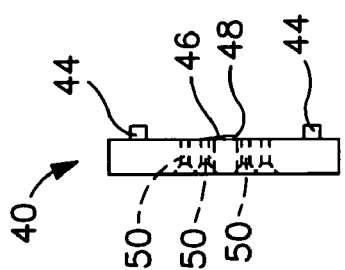
FIG. 6 is a side view, partially in broken lines, of the component of FIG. 4.

With reference to FIGS. 5-7, the underside of the cover includes a ramp 46 which tapers to a shallow wall 48.

Figure 12:
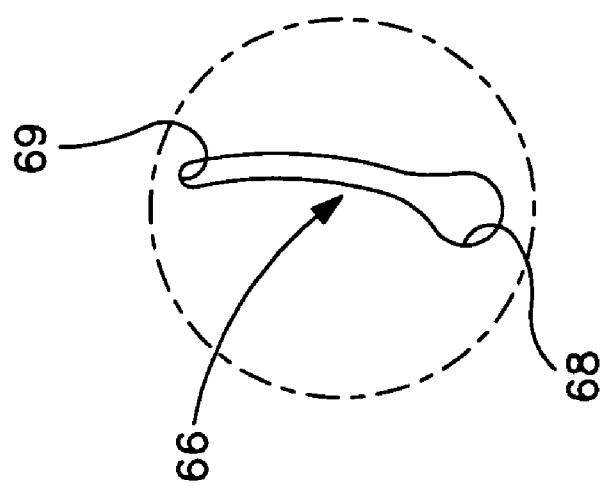
FIG. 12 is an enlarged fragmentary view of the wire stripper plate of FIG. 11.
Figure 11:
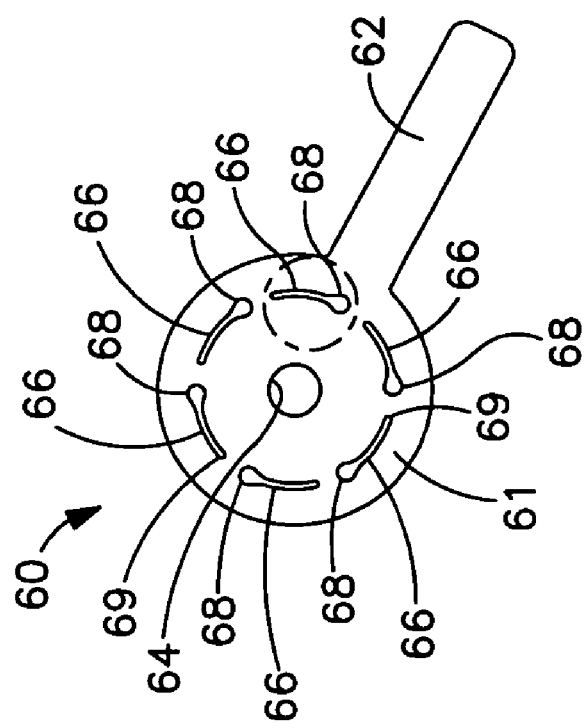
FIG. 11 is a top plan view of a wire stripper plate employed in the connector of FIG. 1.

With additional reference to FIGS. 11 and 12, a wire stripper plate 60 is formed from a conductor, such as brass, and has a flat lollipop-shape with a circular portion 61 which is dimensioned to be commensurate with the recess 28 in the base. An arm 62 extends radially from the circular portion, into the recess 32, and protrudes through the recess. A plastic knob 63 may be mounted to the end of the arm 62. The stripper plate includes a central opening 64 for receiving the bolt 70. The arm 62 is engageable against the walls 31, 33 of the recess to limit angular rotation or pivoting of the stripper plate.

Six congruent, generally arcuate, tapered slots 66 are formed in the stripper plate. Other numbers of slots are possible. The slots 66 are generally equiangularly spaced about the central opening 64. The slots 66 each include an enlarged circular end 68 which is generally commensurate with the diameter of the bores 30 and 50. The slots at the opposite end 69 arcuately converge to a reduced width. The angular distance subtended by the slots 66 is approximately the same as the arcuate travel of the arm 62 between the stops and defined by walls 31, 33.

When the stripper plate 60 is in an open position determined by engagement of the arm 62 against wall 33, and the cover is mated and secured to the base via the bolt assembly, the sets of bores 50, 30 and slots 66 align to form locate wire apertures. A locate wire 14, such as, for example, a wire carried by a detectable Multitape® tape 15 of NEPTCO Inc., of Pawtucket, R.I. for pulling underground cable through a conduit may be inserted through an aperture formed by a bore 50 at the top and a second locate wire inserted through a second aperture bore so that the terminal ends of each of the wires extend through aligned slot end 68 and bore 30 beyond the underside of the base. Upon angular pivoting of the arm 62 via knob 63, the edges of the tapered slot strip non-conductive material away from the wires 14 and provide an electrical contact between the wires received in the slot 62 upon movement of the arm 62 to the closed position defined by wall 31.

A dielectric material such as a gel (not illustrated) may be preferably injected between the base 20, cover 40 and the stripper plate 60 to impede water/moisture migration and enhance the integrity of the electrical connection and grounding.

It should be appreciated that, for connector 10, up to six locate wires 14 may be connected together by extending the wires through the aligned bores when the handle 62 (and stripper plate 60) is in the open position and closing the stripper plate.

In a preferred embodiment, the indicia 92 indicating the open position and the indicia 94 indicating the closed position are preferably molded or affixed to the outside of the upper cover. When the handle arm 62 is moved to the closed position, it rides up the ramp 46 and engages a catch defined by the wall 48.

The bolt 70 is secured at the top by a nut 72. At the underside, the bolt shaft integrally extends from a hex head ground connector 80 which can either receive a number six AWG ground wire 16 in an intermediate slot 82 or connect with a bond bar halo 18 for providing a grounding connection. Securement is secured by a set screw 84.

It will be appreciated that the locate wire connector 10 provides ready flexibility to accept additional locate wires as they require connection and grounding. The connector is rotatably opened to receive the additional wire and then moved to the stable closed position for providing the electrical connection via the stripper plate.

While preferred embodiments of the invention have been set forth for the purposes of illustration, the forgoing description should not be deemed a limitation of the invention herein. Accordingly, various modifications, adaptations and alternatives may occur to one of ordinary skill in the art without departing from the spirit and scope of the claims.

What is claimed:

1. A connector for locate wires comprising:
a platform defining an axis and comprising a plurality of angularly spaced apertures disposed about said axis, said platform comprising a wall generally surrounding said axis and defining a transverse opening spaced from said axis;
a conductive member angularly rotatable relative to said platform and defining a plurality of slots alignable with said apertures and a radial arm projecting from said conductive member extending through said opening and operatively connecting said member to facilitate rotation of said member about said axis so that said arm is moveable between an open and a closed position;
wherein a plurality of wires are positionable in said apertures and slots and said member is rotatable to an angular position to provide an electrical connection with said wires and wherein when said arm is moved to the closed position, the arm rides up a ramp and engages a catch.

2. The connector of claim 1, wherein said slots have an enlarged portion and a reduced portion.

3. The connector of claim 2, wherein during rotation of said member, reduced portions defining said slot strip non-conductive material from said wires.

4. The connector of claim 1, wherein said arm integrally extends from said member.

5. The connector of claim 4, further comprising a pair of stops which engage said arm at one of two angularly spaced positions of said arm.

6. The connector of claim 1, wherein there are six angularly spaced apertures.

7. The connector of claim 1, further comprising a bolt extending through said platform and said conductive member, and a ground connector at one end of said bolt.

8. The connector of claim 1, wherein said slots have a generally arcuate shape with an enlarged portion at one end and a reduced portion at an opposite end, and wherein in said open position, said enlarged portions align with said apertures of said platform.

9. The connector of claim 8, wherein in said closed position, said reduced portions align with said apertures and said arm engages an interior wall of said platform to secure said conductive member in said closed position.

10. The connector of claim 9, further comprising printed indicia indicating the open and the closed positions.

11. A connector for locate wires comprising:
a platform defining an axis and comprising an upper surface defining a plurality of angularly spaced wire apertures disposed about said axis and having a side extending downwardly substantially from said upper surface and spaced from said axis, said side defining an opening;
a conductive member disposed for angular rotation relative to said platform about said axis and defining a plurality of slots alignable with said apertures;
an arm connecting said member and extending generally transversely to said axis through said opening to facilitate rotation relative to said platform between an open and a closed position and wherein when said arm is moved to the closed position. the arm rides up a ramp and engages a catch;
a mounting connection extending outwardly from said platform in a generally transverse direction relative to said axis;
wherein a plurality of wires are positioned in respective apertures and slots and said arm is angularly movable to effect an electrical connection with said wires.

12. The connector of claim 11, wherein said member has a portion adjacent said slot which is engageable against said wire, and upon angular movement removes outer non-conductive material from said wire.

13. The connector of claim 11, wherein said conductive member has a dielectric material on its surface.

14. The connector of claim 13, wherein said dielectric material is a gel.

15. The connector of claim 11, wherein there are six wire apertures.

16. The connector of claim 11, wherein said slots have a generally arcuate shape with an enlarged portion at one end and a reduced portion at an opposite end.

17. The connector of claim 11, wherein said connection comprises a pair of opposed wings, each wing defining an opening.

18. The connector of claim 11, wherein said platform comprises a pair of cooperative mating members, and said conductive member is generally disposed between said members.

19. The connector of claim 11, further comprising a bolt extending through said platform and conductive member, and a ground connector at one end of said bolt.

* * * * *

UNITED STATES PATENT AND TRADEMARK OFFICE
CERTIFICATE OF CORRECTION

PATENT NO. : 7,462,061 B2  Page 1 of 1
APPLICATION NO. : 11/473808
DATED : December 9, 2008
INVENTOR(S) : Balfour, Jr.

It is certified that error appears in the above-identified patent and that said Letters Patent is hereby corrected as shown below:

Title Pg.:

Item (12) delete "Balfour" and insert --Balfour, Jr.--.

Title Pg.:

Item (75) Inventor: delete "William J. Balfour" and insert
            --William J. Balfour, Jr.--.

Column 4:

Line 60, after "position" delete "." and insert --,--.

Signed and Sealed this

Twenty-fourth Day of February, 2009

JOHN DOLL
*Acting Director of the United States Patent and Trademark Office*